US 11,761,854 B2

(12) United States Patent
Baars et al.

(10) Patent No.: US 11,761,854 B2
(45) Date of Patent: Sep. 19, 2023

(54) OPTICAL PARTICLE SENSOR, IN PARTICULAR, EXHAUST GAS SENSOR

(71) Applicant: Robert Bosch GmbH, Stuttgart (DE)

(72) Inventors: Enno Baars, Leonberg (DE); Johannes Weber, Stuttgart (DE); Martin Buchholz, Bietigheim-Bissingen (DE); Radoslav Rusanov, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 346 days.

(21) Appl. No.: 17/285,270

(22) PCT Filed: Sep. 20, 2019

(86) PCT No.: PCT/EP2019/075369
§ 371 (c)(1),
(2) Date: Apr. 14, 2021

(87) PCT Pub. No.: WO2020/088843
PCT Pub. Date: May 7, 2020

(65) Prior Publication Data
US 2021/0372886 A1  Dec. 2, 2021

(30) Foreign Application Priority Data

Oct. 31, 2018 (DE) .......................... 102018218734.7

(51) Int. Cl.
*G01M 15/10* (2006.01)
*G01N 15/00* (2006.01)
*G01N 15/02* (2006.01)

(52) U.S. Cl.
CPC ...... *G01M 15/108* (2013.01); *G01N 15/0205* (2013.01); *G01N 2015/0046* (2013.01)

(58) Field of Classification Search
CPC ............ G01M 15/108; G01N 15/0205; G01N 2015/0046; G01N 1/2247; G01N 1/2035;
(Continued)

(56) References Cited

U.S. PATENT DOCUMENTS

| 5,083,865 A * | 1/1992 | Kinney ................. G01N 21/53 356/338 |
| 6,346,179 B1 * | 2/2002 | Makino ............. G01N 27/4077 204/426 |

(Continued)

FOREIGN PATENT DOCUMENTS

| DE | 102013207629 A1 | 10/2014 |
| DE | 102013221255 A1 | 4/2015 |

(Continued)

OTHER PUBLICATIONS

International Search Report for PCT/EP2019/075369, dated Jan. 15, 2020.

*Primary Examiner* — Dominic J Bologna
*Assistant Examiner* — Jarreas C Underwood
(74) *Attorney, Agent, or Firm* — NORTON ROSE FULBRIGHT US LLP; Gerard Messina (57) ABSTRACT

A particle sensor for detecting particles in a flow of a measuring gas for detecting soot particles in an exhaust gas channel of a burner or of an internal combustion engine. The particle sensor includes a device for generating or for supplying laser light, a device for focusing laser light, and a device for detecting or transferring thermal radiation. The particle sensor includes at least one optical access, which separates an area exposed to the measuring gas from an area facing away from the measuring gas not exposed to the measuring gas, the device for generating or supplying laser light and/or the device for detecting or for transferring thermal radiation being situated in the area facing away from the measuring gas, wherein the particle sensor removes a sub-flow from the measuring gas flow and supplies it to the laser focus and further fluidically shields the optical access from the sub-flow.

18 Claims, 9 Drawing Sheets

(58) Field of Classification Search
CPC ......... G01N 1/2205; G01N 2001/2223; G01N 1/2273; G01N 2001/225; G01N 1/2252; G01N 1/26; G01N 15/06
See application file for complete search history.

(56) References Cited

U.S. PATENT DOCUMENTS

| | | | |
|---|---|---|---|
| 2011/0011152 A1* | 1/2011 | Ito | G01N 27/4077 73/23.31 |
| 2011/0126610 A1* | 6/2011 | Sekiya | G01N 27/4077 73/25.05 |
| 2013/0167666 A1* | 7/2013 | Jenkins | G01N 1/02 73/863.23 |
| 2014/0230523 A1* | 8/2014 | Stengel | G01N 1/2252 73/28.01 |
| 2018/0023448 A1* | 1/2018 | Zhang | F01N 3/033 73/23.33 |
| 2018/0088082 A1* | 3/2018 | Inoue | F01N 11/00 |
| 2020/0348208 A1* | 11/2020 | Nelson | G01N 15/0606 |

FOREIGN PATENT DOCUMENTS

| | | |
|---|---|---|
| DE | 102017207402 A1 | 11/2018 |
| GB | 2459452 A | 10/2009 |
| WO | 2017084802 A1 | 5/2017 |

* cited by examiner

OPTICAL PARTICLE SENSOR, IN PARTICULAR, EXHAUST GAS SENSOR

FIELD

The present invention relates to a particle sensor for detecting particles in a flow of a measuring gas, in particular, to a sensor for detecting soot particles in an exhaust gas channel of a burner or of a self-igniting or spark-ignited internal combustion engine, as it may be used, for example, for the purpose of the on-board diagnosis of a corresponding soot particle filter. Other fields of application are, of course, also possible, for example, portable systems for monitoring emissions and systems for measuring ambient air quality.

BACKGROUND INFORMATION

German Patent Application No. DE 10 2017 207 402 A1 involves a soot particle sensor including a laser module that includes a laser and including a detector configured to detect thermal radiation. The soot particle sensor described therein is distinguished by the fact that the laser is configured to generate laser light and that the soot particle sensor includes an optical element situated in the beam path of the laser, which is configured to bundle laser light emanating from the laser module into one spot, and that the detector is situated in the soot particle sensor in such a way that it detects radiation emanating from the spot.

The sensor described in German Patent Application No. DE 10 2017 207 402 A1 describes the measuring principle of laser-induced incandescence.

In German Patent Application No. DE 10 2017 207 402 A1, it is further also provided that the soot particle sensor is subdivided into a first part, which is configured to be exposed to a measuring gas, and in a second part not to be exposed to the measuring gas, which contains the optical components of the soot particle sensor, both parts being separated by a separating wall impermeable to the measuring gas, and in that a window, which is transparent both for the laser light as well as for the radiation emanating from the spot, is mounted in the beam path of the laser light.

SUMMARY

The present invention is based on the observation of the inventors that in a particle sensor, the optical access of the particle sensor may be contaminated over its service life. In this case, it has been found that under adverse conditions, the contamination may progress to the point that a sufficient transparency of the optical access for laser light and thermal radiation is no longer ensured, and the particle sensor no longer functions properly.

According to an example embodiment of the present invention, it is therefore provided that the particle sensor removes a sub-flow from the measuring gas flow and supplies it to the laser focus, and furthermore fluidically shields the optical access from the sub-flow. In this way, a sub-flow which is representative of the measuring gas flow with respect to its particle content, is fed to the laser focus, i.e., to the actual location of the particle detection. However, the optical access is shielded from the measuring gas flow as well as from the sub-flow, i.e., the measuring gas flow and the sub-flow do not flow against the optical access, and contaminants, for example, soot particles, contained in the measuring gas flow and sub-flow are unable to reach the optical access. Thus, a contamination of the optical access no longer occurs or occurs only to a tolerable degree over the service life, and in this respect the service life of the particle sensor is not limited or significantly increased.

The detection of particles is understood within the scope of the present invention to mean, in particular, a measurement, whose result is the mass and/or the number of particles and/or the mass and/or the number of particles in a flow per unit time, in particular, at the location of the laser focus. The detection of particles may also include the obtainment of pieces of information relating to the size and/or to the size distribution of the particles.

Means (e.g., a device) for generating laser light is understood within the scope of the present invention to mean, in particular, a laser, for example, a diode laser, in particular, a CW laser, whose output power and focusability are so high that it is able to excite soot particles for emitting thermal radiation, for example, at above 3500 K.

Means (e.g., a device) for supplying laser light is understood within the scope of the present invention to mean, in particular, an optical fiber, which is transparent to the relevant laser light, and/or an optical window, which is transparent for the laser light. The laser light may be, for example, ultraviolet, visible or infrared.

Means (e.g., a device) for focusing laser light is understood within the scope of the present invention to mean, in particular, a convergent lens, which is transparent for the relevant laser light. Alternatively, it could also be a concave mirror.

Means (e.g., a device) for transferring thermal radiation is understood within the scope of the present invention to mean, in particular, an optical fiber, which is transparent for the relevant thermal radiation, and/or an optical window, which is transparent to the relevant thermal radiation. Thermal radiation is understood within scope of the present invention to mean, in particular: electromagnetic radiation, corresponding to the emission of hot bodies, for example, incoherent infrared and/or visible radiation.

An optical access is understood within the scope of the present invention to mean, in particular, an optical fiber or an optical window. The optical access may, in particular, also fulfill the function of the means for focusing laser light, it may be designed, for example, as a convergent lens.

The removal of a sub-flow from the measuring gas flow is understood within the scope of the present invention to mean, in particular, that a portion of the measuring gas flow, namely, the sub-flow, is diverted into the interior of the particle sensor, whereas the remaining other portion of the measuring gas flow flows past the particle sensor without entering into its interior. The sub-flow may also be assembled of multiple individual flows, which enter separately from one another into the interior of the particle sensor.

Within the scope of the present invention, inlet openings and overflow openings may have diameters of 1 to 3 mm or may have corresponding cross sectional areas in the case of non-circular geometry.

The fluidic shielding of the optical access from the sub-flow is understood within the scope of the present invention to mean, in particular, a fluid-dynamic shielding, i.e., understood to mean that the sub-flow is diverted in such a way that it does not encounter the optical access or, in other words, that an area not flowed through by the sub-flow remains in front of the optical access. This may be reflected, in particular, by the fact that the area not flowed through represents in terms of the transport phenomena a diffusion-dominated flow area, in contrast to the areas flowed through in the interior of the sensor, which in this respect should be referred to as convection-dominated flow areas.

The fluidic shielding of the optical access may take place using particular constructive measures, which are explained by way of example but not exhaustively below in the exemplary embodiments.

In one refinement of the present invention, it is provided that the particle sensor includes a, for example, metallic housing, in or at which the optical access is situated, and that the housing includes at least one inlet opening through which a sub-flow is removable from the flow of the measuring gas and introducible into the interior of the housing, and that the housing includes at least one outlet opening, through which the sub-flow exits the housing, and that a shielding is provided in the interior of the housing, which redirects the sub-flow in a direction oriented away from the optical access, i.e., prevents, in particular, via the redirection the optical access from being affected by the sub-flow and/or ensures that the optical access is not affected by the sub-flow.

The redirection of the sub-flow for the purpose of shielding the optical access thus takes place, in particular, from a direction oriented toward the optical access in a direction oriented away from the optical access; the sub-flow would have acted on the optical access had the measure effectuating the redirection or the shielding not been provided.

The redirection may take place, in particular, from a direction oriented from the inlet opening toward the optical access in a direction oriented away from the optical access to the outlet opening.

The redirection may take place, in particular, from a direction oriented from an overflow opening (see below) toward the optical access in a direction oriented away from the optical access to the outlet opening.

In one refinement of the present invention, it may be provided that the housing of the particle sensor includes a housing body and a protective tube module fastened to the housing body.

The housing body may, for example, be a massive steel component including a through-channel in its interior, which includes a thread, in particular, an external thread, and a mounting profile, for example, an external hexagonal profile. A two-part design of the housing body is also possible, in which a cap nut/cap screw including the thread and the assembly profile is slid onto a housing body sleeve.

The protective tube module may, for example, include multiple protective tubes, which are produced from sheet steel, and of which at least one or all are fastened to the housing body, for example, are welded and/or are inserted into the housing body. The protective tubes may also be welded with one another or inserted into one another, in particular, compressed.

A one-part design of the housing body including the protective tube module is advantageous.

In a refinement in accordance with an example embodiment of the present invention for providing a protective tube module, it is provided that the protective tube module includes at least one inlet opening, through which a sub-flow is removable from the flow of the measuring gas and introducible into the interior of the protective tube module, and includes at least one outlet opening, through which the sub-flow exits the protective tube module.

The inlet opening or inlet openings and the outlet opening or outlet openings and an overflow opening or overflow openings (see below) may be designed as holes in the protective tube module or in the individual tube modules. Swirl flaps may also be added in each case, which are, in particular, rigid formations on the protective tube module or on a protective tube and which guide and/or redirect the sub-flow when flowing through the holes in a predefined direction. The combination of a hole including a swirl flap may, for example, be manufactured by cutting or impressing sections in the protective tube module or in the individual protective tubes.

It is provided in accordance with an example embodiment of the present invention, in particular, that a shielding is provided in the interior of the protective tube module, through which the fluidic shielding of the optical access from the sub-flow, in particular, as explained above, takes place. Thus, with the aid of a fluidic shielding, a redirection of the sub-flow, in particular, takes place in a direction oriented away from the optical access. In the absence of the shielding, the sub-flow would, in particular, have acted on the optical access and particles contained in the sub-flow would have potentially contaminated, in particular, the optical access.

In one advantageous refinement of the present invention, the protective tube module includes at least two protective tubes, namely, a first protective tube and a second protective tube.

In this case, the first protective tube may include at least one inlet opening, through which a sub-flow is removable from the flow of the measuring gas and introducible into the interior of the protective tube module.

The second protective tube may be situated in the interior of the first protective tube in such a way that an annular space is formed between the first and the second protective tube. The first and the second protective tube may have as a basic shape (i.e., apart from holes, swirl flaps and manufacturing-related minimal dimensional deviations) an axial symmetry and, in this respect, be situated concentrically or coaxially to one another.

The second protective tube may also include at least one overflow opening, through which the sub-flow flows from the annular space into a gas space situated in the interior of the second protective tube.

The outlet opening may be formed at the first or at the second protective tube, in particular at an end face of the particle sensor located at a measuring gas side of the optical access. It may, in particular, be a single outlet opening.

In this context, a means (e.g., a device), in particular, is provided, which redirects the sub-flow, as it flows through or after it flows through the overflow opening, in a direction oriented away from the optical access and, in particular, toward the outlet opening. This means corresponds, in particular to the fluidic shielding previously mentioned above. Reference is made to the corresponding explanations.

Such a means, which redirects the sub-flow as it flows through or after it flows through the overflow opening in a direction oriented away from the optical access and, in particular, toward the outlet opening, may be implemented in various ways.

According to one specific embodiment of the present invention, this means is implemented by at least one swirl flap designed at the overflow opening of the second protective tube, which points in a direction away from the optical access and, in particular, toward the outlet opening. Thus, the sub-flow enters here into the gas space already at a direction oriented away from the optical access. It therefore does not act on the optical opening.

According to another specific embodiment of the present invention, this means is implemented by a third protective tube, which is situated in the second protective tube. It may be a third protective tube, which tapers in a conical or step-like manner at the level of the overflow opening in the direction pointing from the optical access to the outlet opening. The sub-flow, after flowing through the overflow opening, encounters in this case the third protective tube and the sub-flow is redirected away from the optical access due to the tapering geometry of the protective tube.

According to yet another specific embodiment of the present invention, this means is implemented by a recess, for example, a groove, formed in an end face of the housing body pointing away from the optical access, which is situated opposite the overflow opening of the second protective tube. The recess, for example, the groove, redirects the sub-flow after the sub-flow flows through the overflow opening, for example, by up to 180°, away from the optical access and, in particular, toward the outlet opening.

As a result, a means may also be qualified to redirect the sub-flow as it flows through or after it flows through the overflow opening in a direction oriented away from the optical access and, in particular, toward the outlet opening, so that as viewed from the inlet opening and/or from the overflow opening, it hinders the visibility of the optical access. In other words: The means is situated geometrically between the inlet opening and the optical access and/or between the overflow opening and the optical access. This feature may relate to the entire spatial extension of the optical access or else may already be fulfilled if it relates only to a portion of the spatial extension of the optical access, for example, if, as viewed from the overflow opening, the optical access is partly visible and partly covered by the means.

It may be advantageously provided in accordance with an example embodiment of the present invention that the outlet opening is formed at an end face of the protective tube module directed away from the housing body, and that the inlet opening, as viewed from the optical access, is situated in front of the outlet opening in the direction pointing from the optical access to the outlet opening. In other words, therefore, the outlet opening is situated at a distal end of the protective tube module or of the particle sensor, the at least one inlet opening is situated proximally from the outlet opening. Such an arrangement ensures in the case of the arrangement of the particle sensor within a flow channel that a measuring gas flow has a higher velocity at the location of the outlet opening than at the location of the inlet opening. The static pressure is then higher at the location of the inlet opening than at the location of the outlet opening and the sub-flow flows through the interior of the protective tube module or of the particle sensor starting from the inlet opening toward the outlet opening.

Multiple inlet openings may also be provided. For example, 6 to 12 inlet openings may be provided. These may be partially or collectively situated at the same level in the direction pointing from the optical access to the outlet opening. What was said within the scope of the application for the inlet opening applies to multiple or to all of these inlet openings. Alternatively, the inlet opening may also be designed as the open orifice of an annular gap present between the first protective tube and the second protective tube.

Multiple overflow openings may also be provided. For example, 4 to 12 overflow openings may be provided. These may be partially or collectively situated at the same level in the direction pointing from the optical access to the outlet opening. What was said within the scope of the application of the overflow opening applies to multiple or to all of these overflow openings.

It may be advantageously provided that the inlet opening, as viewed from the optical access, is situated behind the overflow opening in the direction pointing from the optical access to the outlet opening. Such an arrangement ensures that the sub-flow flows initially in the direction toward the optical access. Once redirected, it may be directed to the laser focus and subsequently exit the protective tube module through the outlet opening.

The laser focus is advantageously situated outside the area fluidically shielded by the sub-flow. Instead, it is situated, in particular, in an area flowed against by the sub-flow.

BRIEF DESCRIPTION OF THE DRAWINGS

Exemplary embodiments of the present invention are represented in the figures and are explained in greater detail below. Identical reference numerals in various figures each identify elements that are identical or at least comparable in function.

DETAILED DESCRIPTION OF EXAMPLE EMBODIMENTS

Figure 1:
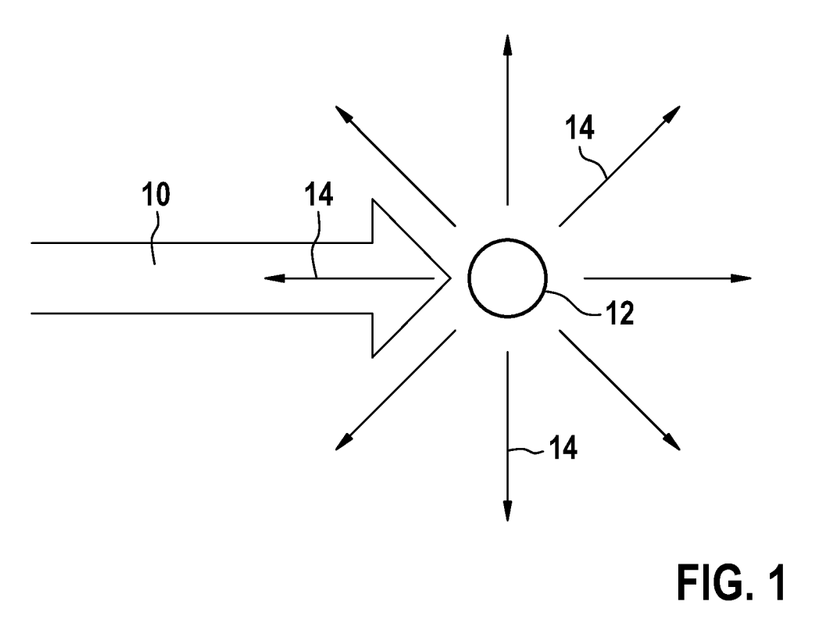
FIG. 1 shows an illustration of the measuring principle based on the laser-induced incandescence, which is preferably used in an example embodiment of the present invention.

FIG. 1 illustrates a measuring principle based on the laser-induced incandescence. High-intensity laser light 10 strikes a particle 12, for example, a soot particle. The intensity of laser light 10 is so high that the energy of laser light 10 absorbed by particle 12 heats particle 12 to several thousand degrees Celsius. As a result of the heating, particle 12 emits significant radiation 14 in the form of thermal radiation spontaneously and essentially in no preferred direction. A portion of radiation 14 emitted in the form of thermal radiation is therefore also emitted opposite to the direction of incident laser light 10.

Figure 2:
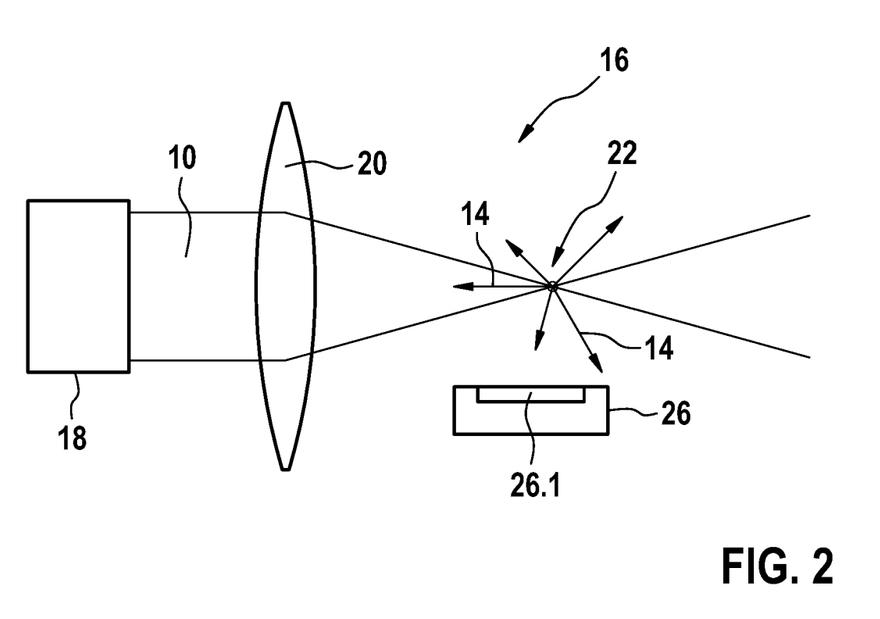
FIG. 2 shows a basic structure for illustrating the operating mode of the sensor.

FIG. 2 schematically shows a basic structure for illustrating the operating mode of particle sensor 16. Particle sensor 16 includes here a laser 18 designed as a CW laser module (CW: continuous wave), the preferably collimated laser light 10 of which is focused using at least one convergent lens 20 situated in the beam path of laser 18 to a very small focus 22, in which the intensity of laser light 10 is sufficiently high for laser-induced incandescence. The present invention is not limited to the use of a CW laser. It is also possible to use pulsed-operated lasers.

The dimensions of spot 22 are in the range of several μm, in particular in the range of at most 200 μm, so that particles 12 crossing spot 22 are excited for emitting evaluatable radiation power, whether it be through laser-induced incandescence or through chemical reactions (in particular, oxidation). As a result, it may usually be assumed that a particle 12 is always located in spot 22 and that an instantaneous measuring signal of particle sensor 16 originates only from this at most one particle 12. The measuring signal is generated by a detector 26, which is situated in particle sensor 16 in such a way that it detects radiation 14, in particular, thermal radiation originating from particles 12 transiting through spot 22. For this purpose, detector 26 preferably includes a photodiode 26.1. A single particle measurement thus becomes possible which, in principle, even enables the extraction of pieces of information about particle 12 such as size and velocity.

Figure 3:
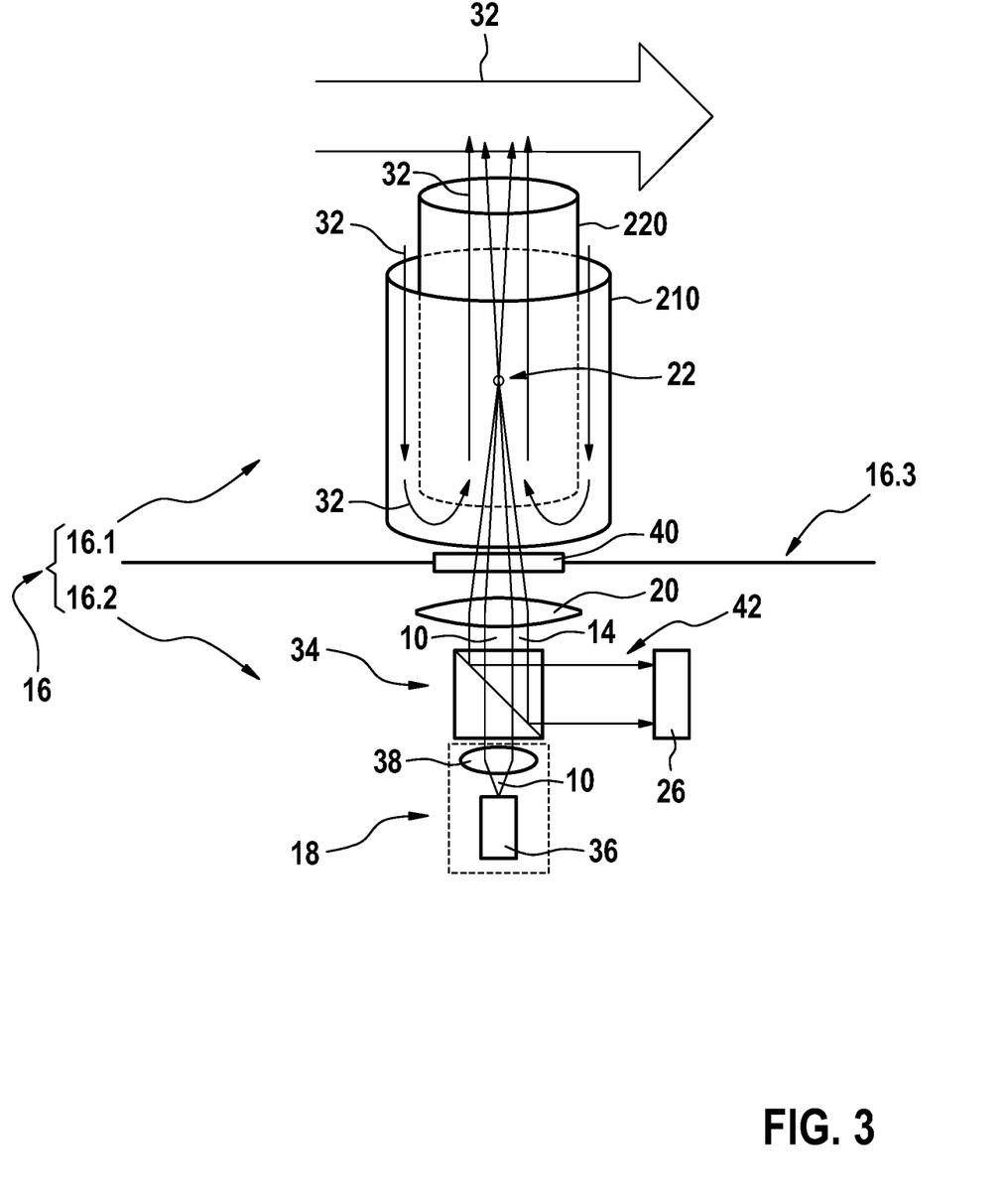
FIG. 3 shows by way of example a basic structure of a particle sensor according to an example embodiment of the present invention.

FIG. 3 shows by way of example a basic structure of a particle sensor 16 according to the present invention.

Particle sensor 16 includes an arrangement made up of a first outer protective tube 210 and a second inner protective tube 220. The arrangement is only roughly and schematically shown here, reference is made in this respect to FIGS. 4, 5 and 6.

Particle sensor 16 includes a laser 18, which generates preferably collimated laser light 10. A beam splitter 34 is located in the beam path of laser light 10. A portion of laser light 10 passing through beam splitter 34 without deflection is focused by convergent lens 20 to a very small focus 22. In this focus 22, the light intensity is high enough to heat particles 12 transported with exhaust gas 32 to several thousand degrees Celsius so that heated particles 12 emit significant radiation 14 in the form of thermal radiation. This radiation 14 is in the near-infrared and visible spectral range, for example, without the present invention being limited to radiation 14 from this spectral range. A portion of this undirected radiation 14 emitted in the form of thermal radiation, is detected by convergent lens 20 and directed via beam splitter 34 to detector 26. This structure has the advantage that only one optical access 40 to exhaust gas 32 is required, since the same optical system, in particular, the same convergent lens 20, is used for generating focus 22 and for detecting radiation 14 emanating from particle 12. Exhaust gas 32 is one example of a measuring gas. The measuring gas may also be another gas or a gas mixture, for example, ambient air.

Laser 18 includes a laser diode 36 and a second lens 38, which preferably collimates laser light 10 emanating from laser diode 36. The use of laser diode 36 represents a particularly cost-effective and easily manageable option for generating laser light 10. The preferably collimated laser light 10 is focused by convergent lens 20.

Optical particle sensor 16 includes a first part 16.1 (exhaust gas side) exposed to the exhaust gas and a second part 16.2 (clean gas side) not exposed to the exhaust gas, which contains the optical components of particle sensor 16. Both parts are separated by a separating wall 16.3, which extends between protective tubes 210, 220 and the optical elements of particle sensor 16. Wall 16.3 serves to insulate the sensitive elements from exhaust gas 32. Mounted in separating wall 16.3 in the beam path of laser light 10 is an optical access 40 designed as a window, through which laser light 10 enters into exhaust gas 32, and via which radiation 14 emanating from focus 22 is able to strike convergent lens 20 and from there detector 26 via beam splitter 34.

As an alternative to the exemplary embodiment described herein, the generation of focus 22 and the detection of radiation 14 emanating from particles in focus 22 may take place via separated optical beam paths.

It is also possible to generate focus 22 using lens combinations other than those specified herein merely as an exemplary embodiment. Moreover, particle sensor 16 may also be implemented using laser light sources other than laser diodes 36 specified herein for exemplary embodiments.

Figure 4A:
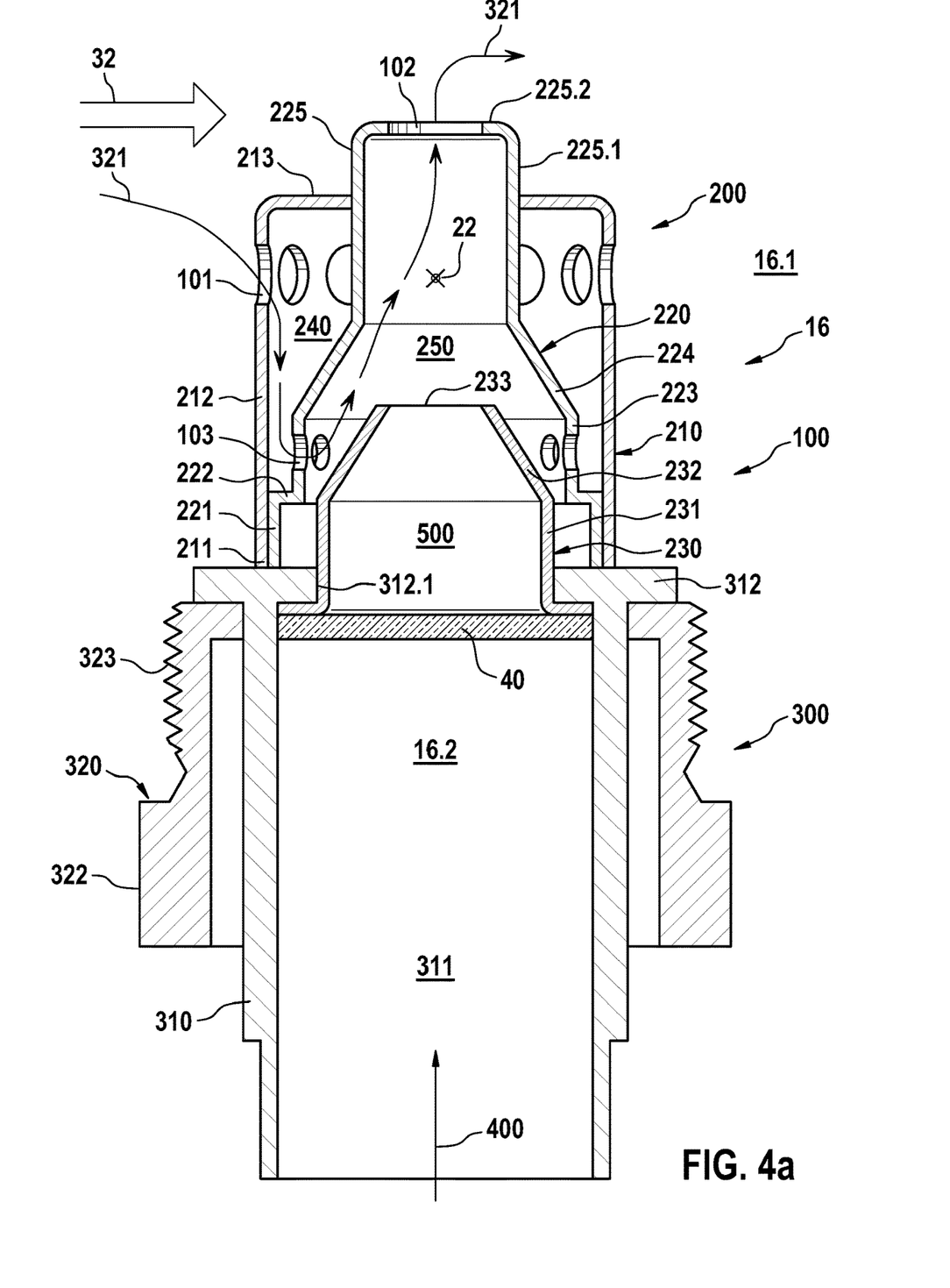
FIGS. 4*a*, 4*b* and 4*c* show three variants of a first exemplary embodiment of the present invention.

FIG. 4a shows a first exemplary embodiment of the present invention. In this case, the components situated in second part 16.2 not exposed to the exhaust gas are omitted in FIG. 4a for better clarity. Reference may be made in this regard to FIG. 3.

Particle sensor 16 includes a housing 100, which is assembled of a housing body 300 and a protective tube module 200 fixed on housing body 300 on the exhaust gas side.

Housing body 300 is in turn assembled of a cylindrical housing body sleeve 310 and a cap screw 320 slidable onto housing body sleeve 310.

Housing body sleeve 310 includes a through-channel 311, which is sealed in a gas-tight manner on the side facing the exhaust gas by an optical window, which forms the optical access 40. Thus, second part 16.2 of particle sensor 16 not exposed to the exhaust gas is situated on the side of optical access 40 facing away from the exhaust gas.

Housing body sleeve 310 further includes a circumferential annular support element 312 at its end facing the exhaust gas, the exhaust gas side of which is provided for installing in a connecting piece, for example, of an exhaust gas tract. The side of support element 312 facing away from the exhaust gas is acted upon by cap screw 320. The lateral area of cap screw 320 includes an external thread 323 and a hexagonal profile 322, so that particle sensor 16 is fixable, for example, in an exhaust tract of an internal combustion engine.

Protective tube module 200 is fixed in part 16.1 of particle sensor 16 exposed to the exhaust gas on housing body sleeve 310 on the exhaust gas side of support element 312. Protective tube module 200 in this example is made up of a first protective tube 210, a second protective tube 220 and a third protective tube 230.

First protective tube 210 has a pot-shaped design, including a pot rim 211 which is fastened, for example, welded at support element 312 of housing body sleeve 310. First protective tube 210 further includes a pot wall 212 forming a lateral area and a pot base 213. A circumferential ring of holes made up, for example, of 12 inlet openings 101 of particle sensor 16 is formed in pot wall 212 close to pot base 213.

Second protective tube 220 has an essentially hat-shaped design and is situated essentially in the interior of first protective tube 210. Second protective tube 220 abuts with a circumferential radial flange section 221 axially against support element 312 of housing body sleeve 310 and radially against the interior side of pot wall 212 of first protective tube 210. An overflow opening section 223 of second protective tube 220 tapered via an annular step 222 is connected to radial flange section 221 of second protective tube 220. A ring of holes made up of, in the example, 12 overflow openings 103 is provided in overflow opening section 223, which connect an annular space 240 formed between first protective tube 210 and second protective tube 220 to a gas space 250 formed in the interior of second protective tube 220. A conically tapering area 224 is connected to overflow opening section 223 of second protective tube 220, and connected to this is a cup-shaped end area 225 of second protective tube 220, which is pressed with its lateral area 225.1 into an opening in pot base 213 of first protective tube 210. Outlet opening 102 of particle sensor 16 which, in the present example, is only slightly smaller than end face 225.2 itself, is provided in end face 225.2 of end area 225 of second protective tube 220.

Third protective tube 230 is in turn situated in the interior of second protective tube 220. It includes a first, straight cylindrical section 231, with which it is pressed into an opening 312.1 of support element 312. A conically tapering section 232, which is open on side 233 of third protective tube 230 facing the exhaust gas is connected to straight cylindrical section 231 of third protective tube 230.

Conically tapering section 232 of third protective tube 230 is situated at the same axial level as overflow openings 103 in second protective tube 220 along an axial direction 400, which is defined, for example, by the direction pointing from optical access 40 to outlet opening 102.

As a result of the structure of particle sensor 16 and, in particular, of housing 100, a sub-flow 321 is removable from a flow of an exhaust gas 32, which initially enters through inlet openings 101 of particle sensor 16 situated in first protective tube 210 into an annular space 240 situated between first protective tube 210 and second protective tube 220, from where it enters through overflow openings 103 in second protective tube 220 into gas space 250 situated in the interior of second protective tube 220, is redirected there by conically tapering section 232 of third protective tube 230 and finally exits second protective tube 220 and thus protective tube module 200 again through outlet opening 102.

The redirection at conically tapering section 232 of third protective tube 230 ensures that sub-flow 321 does not arrive at optical access 40. In this respect, the latter is situated in an area 500 shielded from sub-flow 321. Particles 12 potentially contained in exhaust gas 32 are thus unable to contaminate optical access 40.

Figure 4B:
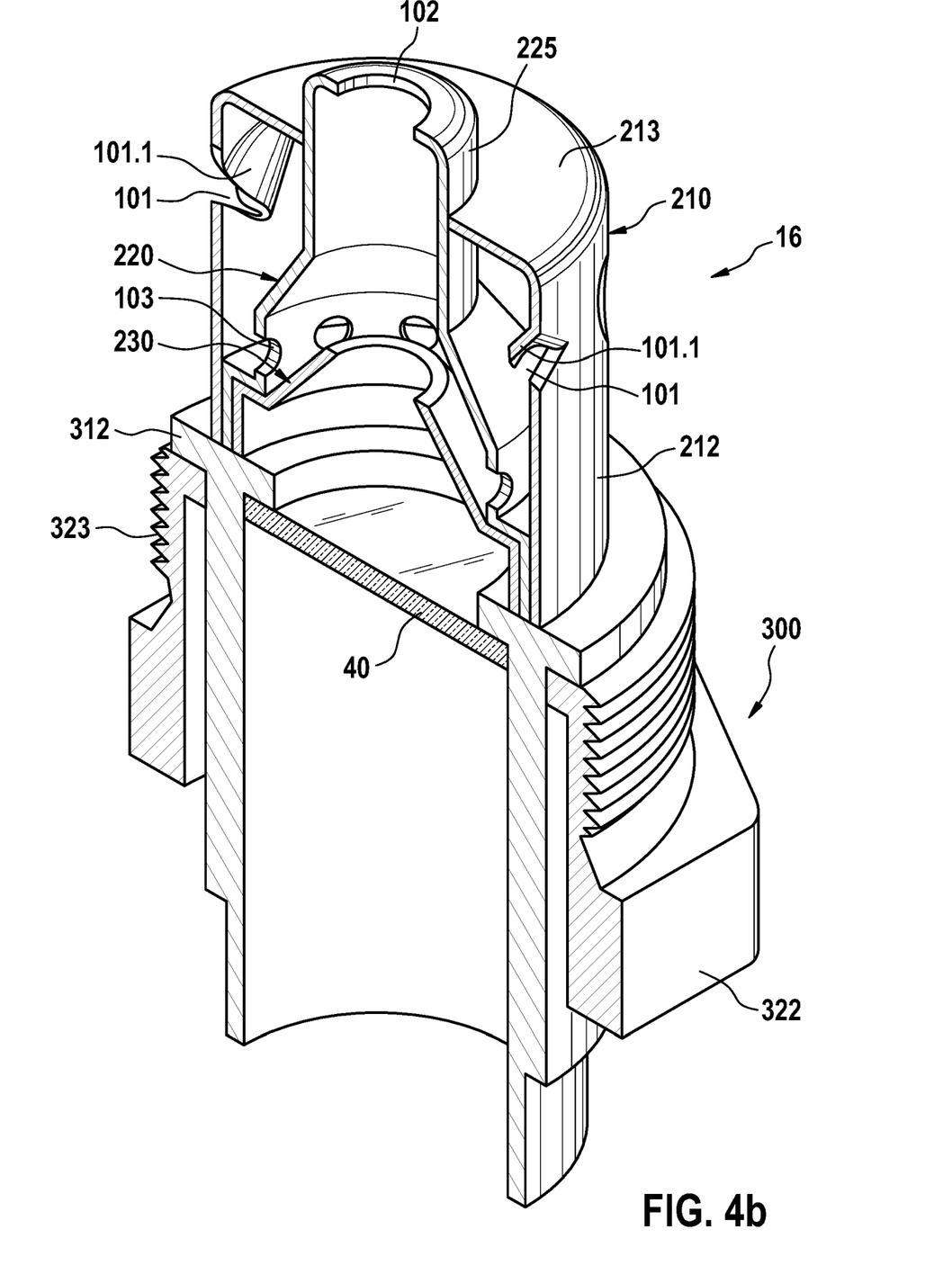

FIG. 4b shows one variant, in which inlet openings 101 of particle sensor 16 are not formed as simple holes, but as holes provided with swirl flaps 101.1. Swirl flaps 101.1 are configured in such a way that they impose on sub-flow 321 entering into annular space 240 a flow direction, which has one portion that is tangential to lateral area 212 of first protective tube 210 and further has a portion that is directed to housing body 300, i.e., downward in FIG. 4b.

Inlet opening 101 as a combination of hole and associated swirl flap 101.1 may, for example, be manufactured by cutting or pressing sections of first protective tube 210.

Figure 4C:
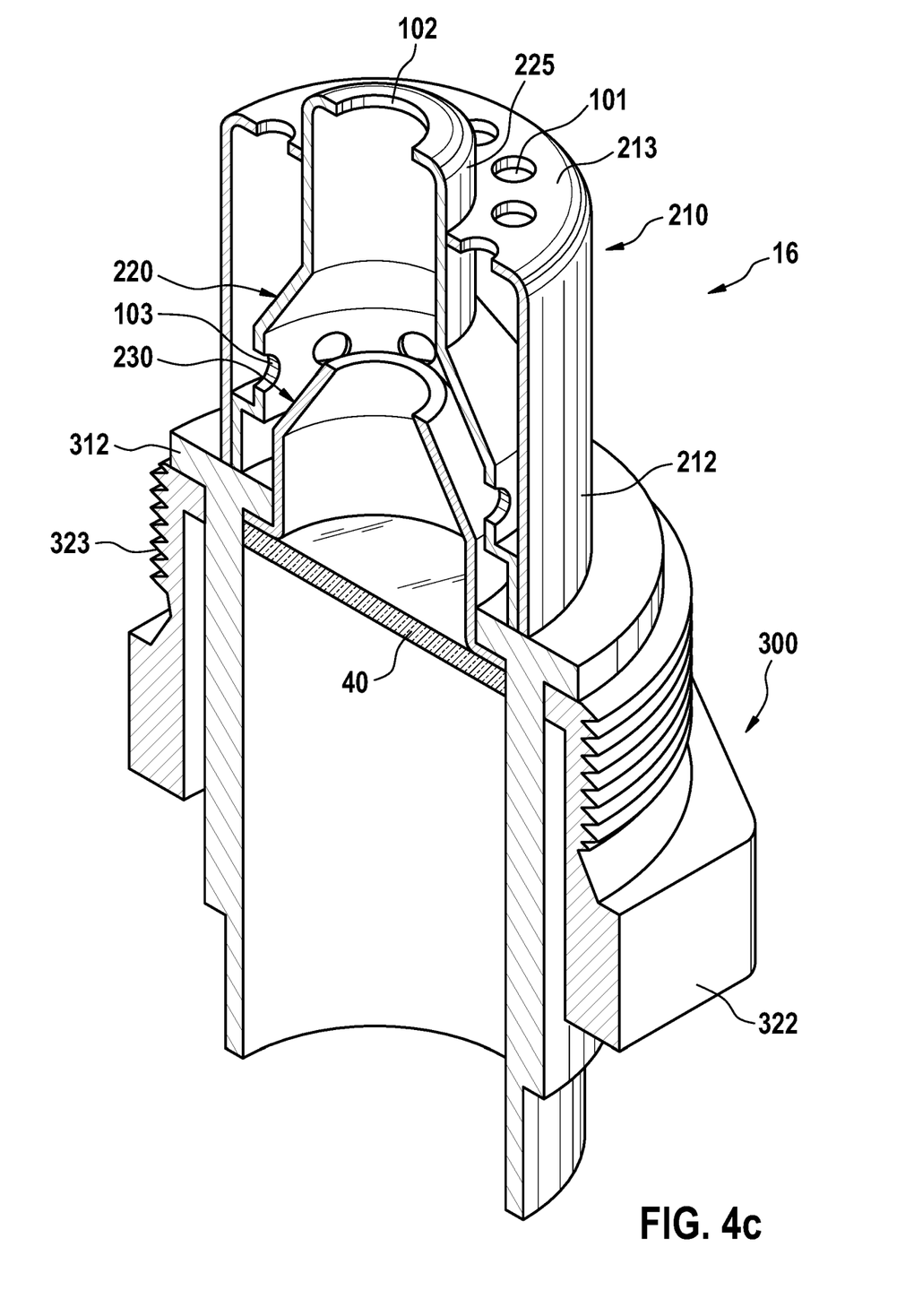

FIG. 4c shows a variant different from particle sensor 16 shown in FIG. 4a. The difference is that inlet openings 101 are not formed in pot wall 212 of first protective tube 210, but are formed on a ring of holes in pot base 213 of first protective tube 210.

Figure 5A:
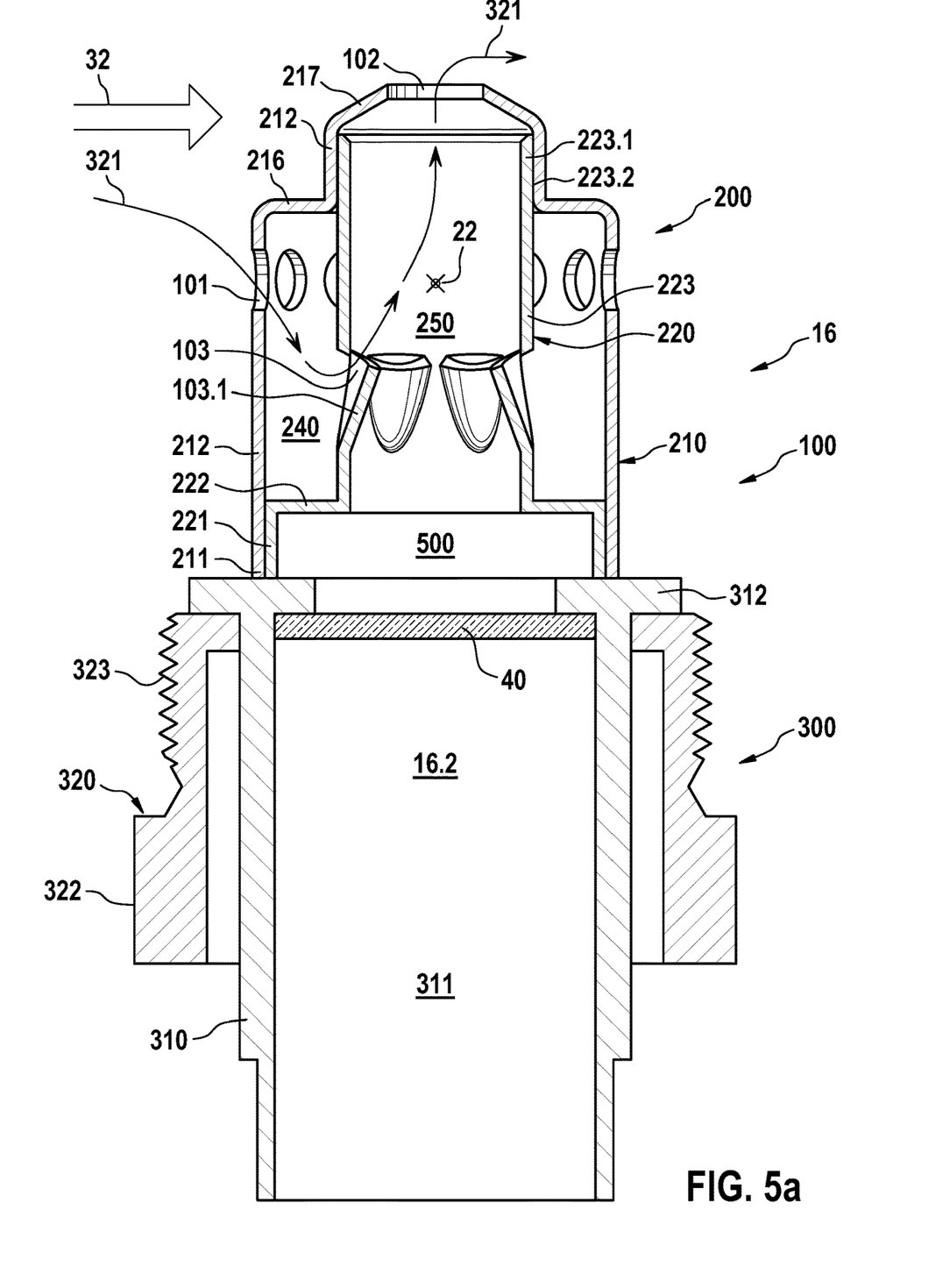
FIGS. 5*a*, 5*b*, and 5*c* show three variants of a second exemplary embodiment of the present invention.

FIG. 5a shows a second exemplary embodiment of the present invention. In this case, the components situated in second part 16.2 not exposed to the exhaust gas are omitted in FIG. 5a for better clarity. Reference may be made in this regard to FIG. 3.

Particle sensor 16 includes a housing 100, which is assembled of a housing body 300 and a protective tube module 200 fixed on the exhaust gas side on housing body 300.

Housing body 300 in turn is assembled of a cylindrical housing body sleeve 310 and a cap screw 320 slidable onto housing body sleeve 310.

Housing body sleeve 310 includes a through-channel 311, which is sealed in a gas-tight manner on the side facing the exhaust gas by an optical window, which forms optical access 40. Thus, second part 16.2 of particle sensor 16 not exposed to the exhaust gas is situated on the side of optical access 40 facing away from the exhaust gas.

Housing body sleeve 310 further includes at its end facing the exhaust gas a ring-like circumferential support element 312, the side on the exhaust gas side being provided for installation in a connecting piece, for example, of an exhaust tract. The side of support element 312 facing away from the exhaust gas is acted upon by cap screw 320. The lateral area of cap screw 320 includes an external thread 323 and a hexagonal profile 322, so that particle sensor 16 is fixable, for example, in an exhaust tract of an internal combustion engine.

Protective tube module 200 is fixed in part 16.1 of particle sensor 16 exposed to the exhaust gas at housing body sleeve 310 on the exhaust gas side of support element 312. Protective tube module 200 in this example is made up of a first protective tube 210 and a second protective tube 220.

First protective tube 210 has a pot-shaped design including a pot rim 211, which is attached, for example, welded, at support element 312 of housing body sleeve 310. First protective tube 210 further includes a pot wall 212 forming a lateral area. Pot wall 212 tapers in a step-like manner above a ring-shaped shoulder surface 216. A connecting conically tapering section 217 includes a central opening on the end face, which represents outlet opening 102 of particle sensor 16.

Second protective tube 220 has essentially the shape of a step-like sleeve open on both sides. It is situated in the interior of first protective tube 210. Second protective tube 220 abuts with a circumferential radial flange section 221 axially against support element 312 of housing body sleeve 310 and radially against the inner side of pot wall 212 of first protective tube 210. An overflow opening section 223 of second protective tube 220 tapered via an annular step 222 and essentially cylindrical is connected to radial flange section 221 of second protective tube 220. A ring of holes made up of, in the example, 8 overflow openings 103 is provided in overflow opening section 223, which connect an annular space 240 formed between first protective tube 210 and second protective tube 220 to a gas space 250 formed in the interior of second protective tube 220.

Overflow openings 103 are designed as holes that include swirl flaps 103.1, swirl flaps 103 imposing on sub-flow 321 entering from annular space 240 into gas space 250 a direction oriented away from the optical access and toward outlet opening 102.

An overflow opening 103 as a combination of hole with associated swirl flap 103.1 may, for example, be manufactured by cutting or pressing sections of second protective tube 220.

Second protective tube 220 in this example comes into a sealing and planar contact 223.2 with end section 223.1 of its overflow opening section 223 facing the exhaust gas in the tapered section of pot wall 212 of first protective tube 210.

As a result of the structure of particle sensor 16 and, in particular, of housing 100, a sub-flow 321 is removable from a flow of an exhaust gas 32, which initially enters through inlet openings 101 of particle sensor 16 situated in first protective tube 210 into an annular space 240 situated between first protective tube 210 and second protective tube 220, from where it enters through overflow openings 103 in second protective tube 220 into gas space 250 situated in the interior of second protective tube 220. When passing through overflow openings 103, a direction is imposed on it, which is oriented away from optical access 40, upward in FIG. 5a. In this regard, optical access 40 is in an area 500 shielded from sub-flow 321. Particles 12 potentially contained in exhaust gas 32 are thus unable to contaminate optical access 40.

Figure 5B:
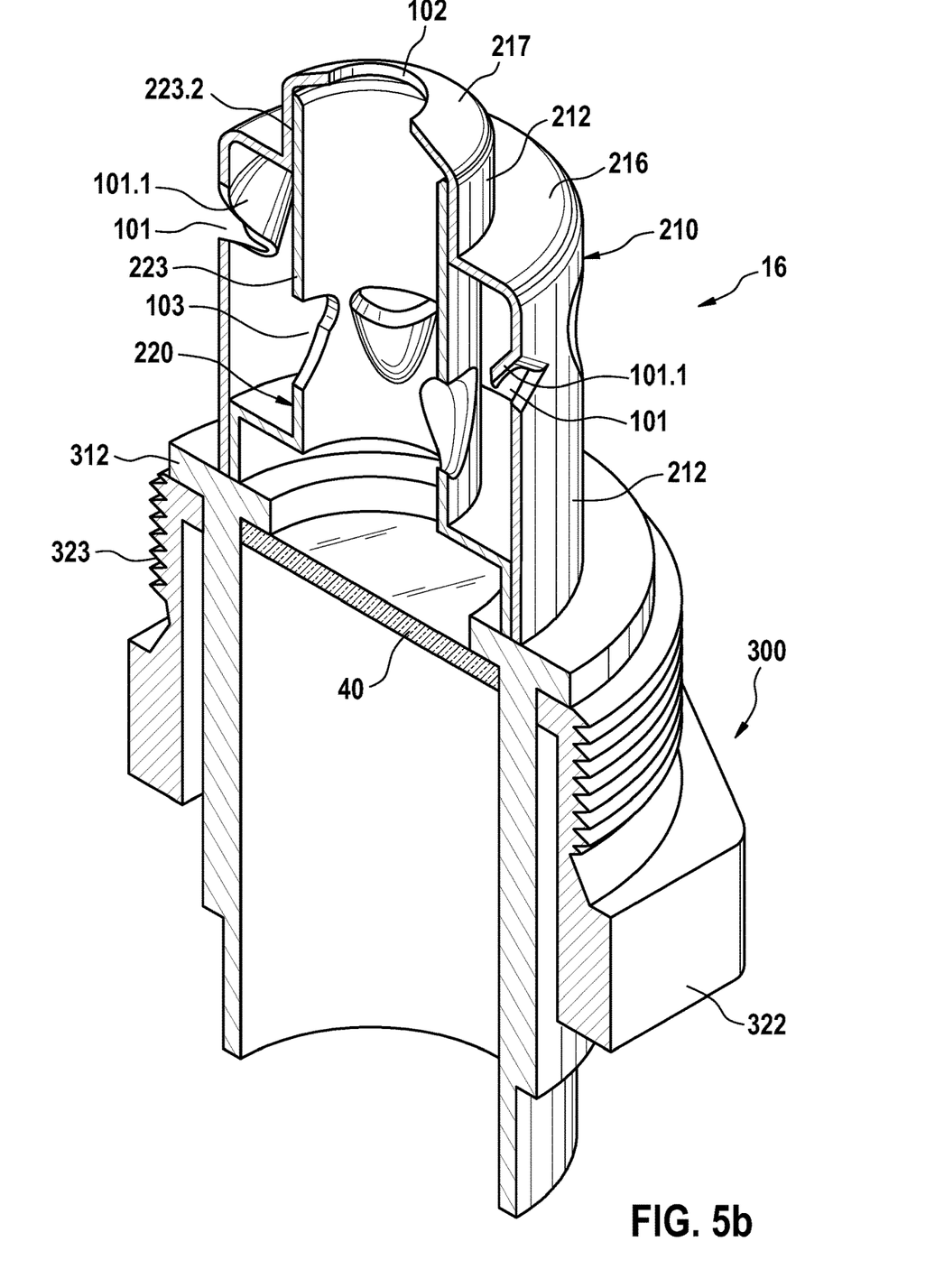

FIG. 5b shows one variant, in which inlet openings 101 of particle sensor 16 are not formed as simple holes, but as holes provided with swirl flaps 101.1. Swirl flaps 101.1 are configured in such a way that they impose on sub-flow 321 entering into annular space 240 a flow direction, which has a portion tangential to lateral area 212 of first protective tube 210 and further has a portion, which is directed to housing body 300, i.e., downward in FIG. 5b.

Inlet opening 101 as a combination of hole including associated swirl flap 101.1 may, for example, be manufactured by cutting or pressing sections of first protective tube 210.

Figure 5C:
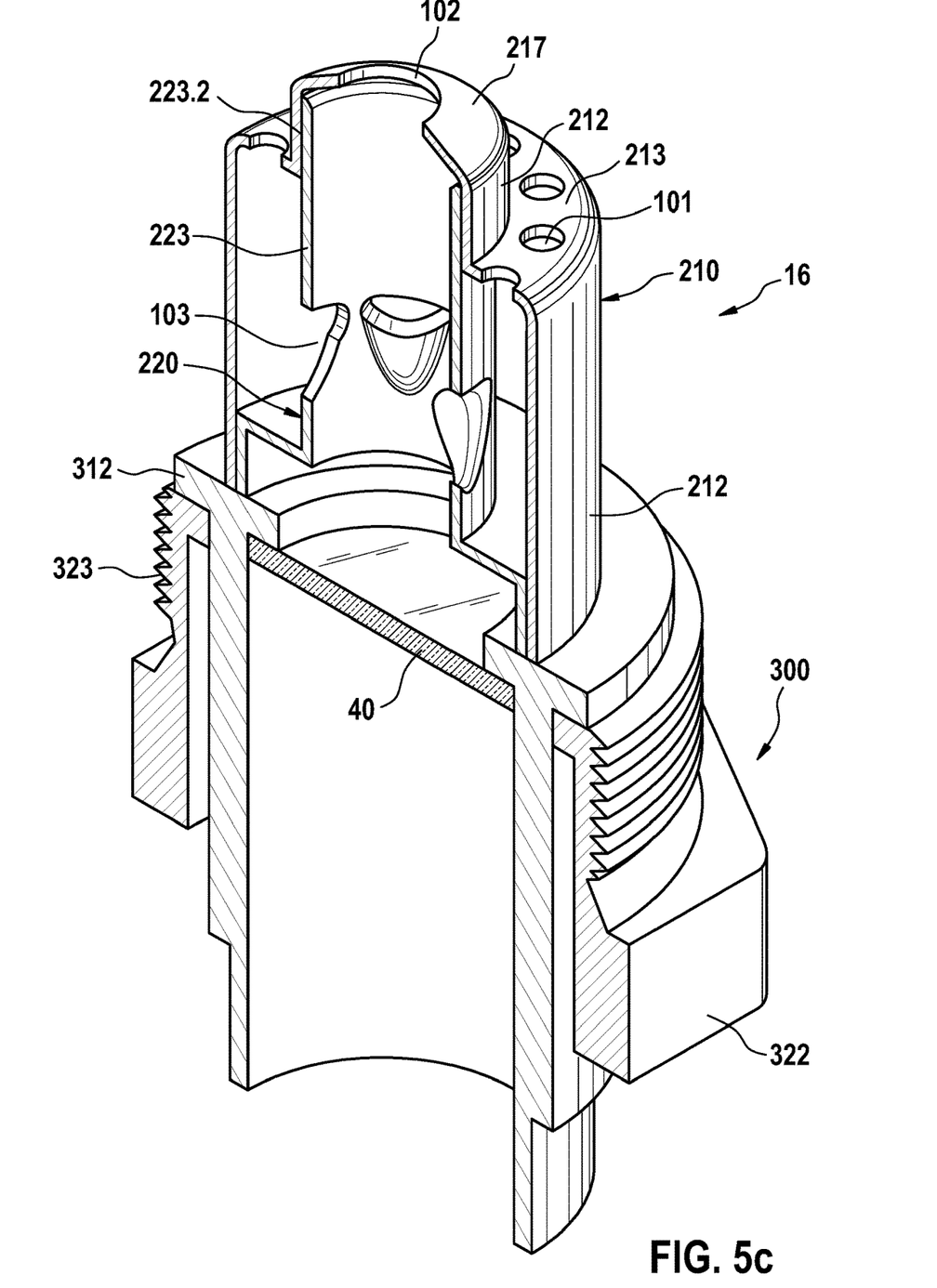

FIG. 5c shows another variant of particle sensor 16 different from that shown in FIG. 5a. The difference is that inlet openings 101 are not formed in pot wall 212 of first protective tube 210, but are formed on a ring of holes in pot base 213 of first protective tube 210.

Figure 6:
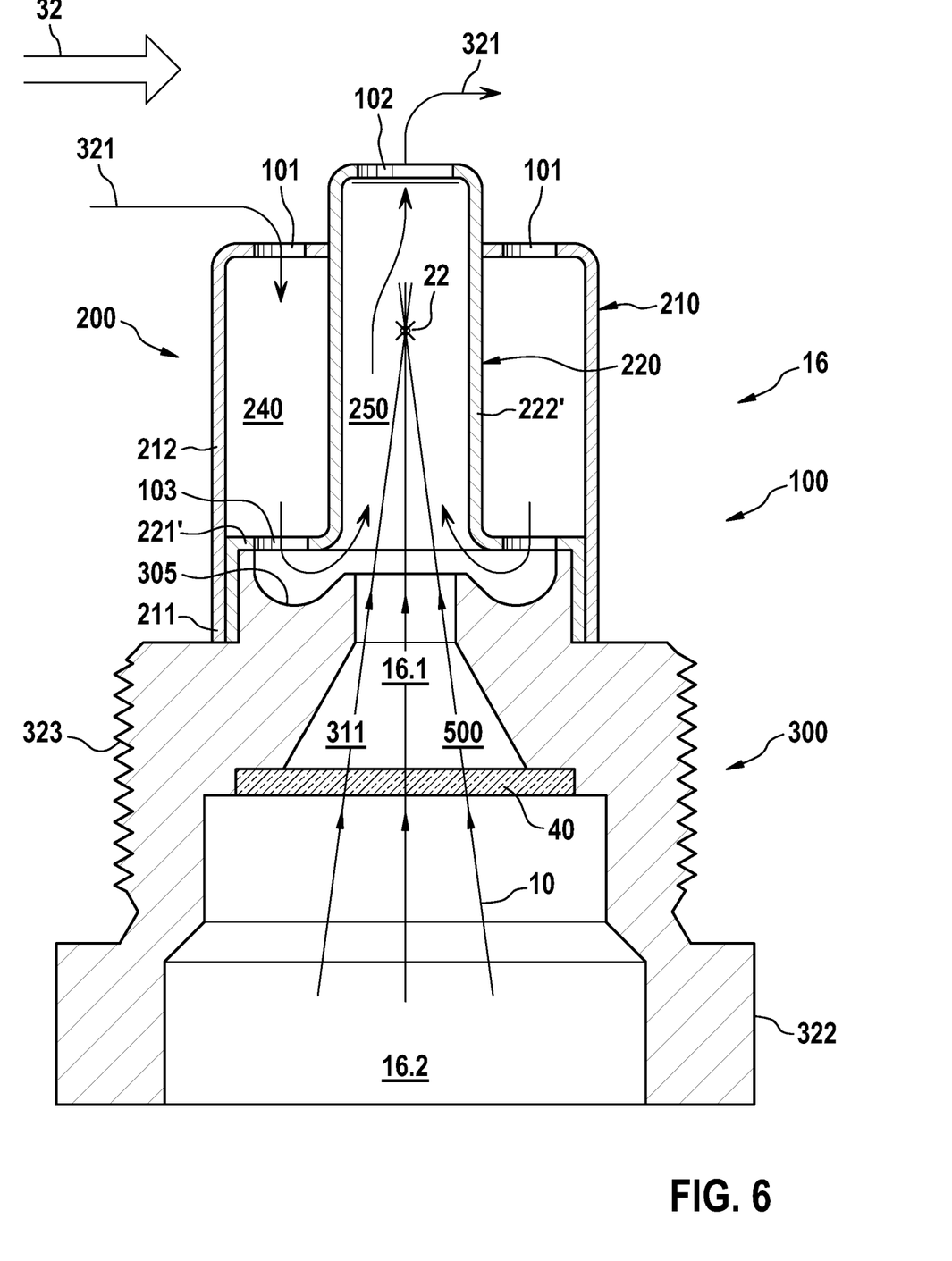
FIG. 6 shows a third exemplary embodiment of the present invention.

FIG. 6 shows a third specific embodiment of the present invention. In this case, the components situated in second part 16.2 not exposed to the exhaust gas are omitted in FIG. 6 for better clarity. Reference may be made in this regard to FIG. 3.

Particle sensor 16 includes a housing 100, which is assembled of a housing body 300 and a protective tube module 200 fixed at housing body 300 on the exhaust gas side.

Housing body 300 includes a through-channel 311, which is sealed in a gas-tight manner on the side facing the exhaust gas by an optical window, which forms optical access 40. Thus, second part 16.2 of particle sensor 16 not exposed to the exhaust gas is situated on the side of optical access 40 facing away from the exhaust gas.

The lateral area of housing body 300 includes, for example, an external thread 323 and a hexagonal profile 322, so that particle sensor 16 is fixable, for example, in an exhaust tract of an internal combustion engine.

Protective tube module 200 is fixed at housing body 300 on the exhaust gas side in part 16.1 of particle sensor 16 exposed to the exhaust gas. Protective tube module 200 in this example is made up of a first protective tube 210 and a second protective tube 220.

First protective tube 210 has a pot-shaped design, including a pot rim 211, which is fastened, for example, welded, at housing body 300. First protective tube 210 further includes a pot wall 212 forming a lateral area.

Second protective tube 220 has an essentially hat-shaped design and is situated essentially in the interior of first protective tube 210. Second protective tube 220 abuts with a circumferential brim section 221' axially against housing body 300 and radially against the interior side of pot wall 212 of first protective tube 210. A ring of holes of, in the example, 8 overflow openings 103 is also situated in brim section 221'. Thus, overflow openings 103 thus point in the direction of housing body 300 and thus enable a gas exchange between annular space 240 formed between first protective tube 210 and second protective tube 220 and a gas space 250 formed in the interior of second protective tube 220.

A hat guard section 222' closed radially and open axially on both sides is connected to brim section 221' of second protective tube 220. The open end of hat guard section 222' facing the exhaust gas forms outlet opening 102 of particle sensor 16. The open end of annular space 240 facing the exhaust gas forms inlet opening 101 of particle sensor 16.

At least one recess 305 is formed in the end face of housing body 300 opposite overflow openings 103. This recess 305 redirects a sub-flow 321 entering through an overflow opening 103, in the example, by almost 108°, away from optical access 40 and toward outlet opening 102.

It may be provided that each overflow opening 103 is provided an individual recess 305 of the end face of housing body 300, for example, a bowl-shaped recess 305, for example, with a round cross section in top view. However, it may also be provided that a single recess 305 in the form of a single circumferential groove is provided in the end face of housing body 300, which is situated opposite all overflow openings 103 together.

As a result of the structure of particle sensor 16 and, in particular, of housing 100, a sub-flow 321 is removable from a flow of an exhaust gas 32, which initially enters through inlet opening 101 of particle sensor 16 situated in first protective tube 210 into an annular space 240 situated between first protective tube 210 and second protective tube 220, from where it enters through overflow openings 103 in second protective tube 220 into gas space 250 situated in the interior of second protective tube 220.

The redirection at recess 305 in housing body 300 ensures that sub-flow 321 does not reach optical access 40. In this regard, optical access 40 is situated in an area 500 shielded from sub-flow 321. Particles 12 potentially contained in exhaust gas 32 are thus unable to contaminate optical access 40.

What is claimed is:

1. A particle sensor for detecting particles in a flow of a measuring gas, comprising:
   a device configured to generate or supply laser light;
   a device configured to focus the laser light;
   a device configured to detect or transfer thermal radiation; and
   at least one optical access, which separates an area exposed to the measuring gas from an area not exposed to the measuring gas;
   wherein the device configured to generate or supply laser light and/or the device configured to detect or transfer thermal radiation is situated in an area facing away from the measuring gas; and
   wherein the particle sensor is configured to remove a sub-flow from the flow of the measuring gas and supply the sub-flow to a laser focus, and to fluidically shield the optical access from the sub-flow.

2. The particle sensor as recited in claim 1, wherein the particle sensor is for detecting soot particles in an exhaust gas channel of a burner or of an internal combustion engine.

3. The particle sensor as recited in claim 1, wherein the particle sensor includes a housing, in or at which the optical access is situated, and the housing including at least one inlet opening, through which the sub-flow is removable from the flow of the measuring gas, and introducible into the interior of the housing, and including at least one outlet opening, through which the sub-flow exits the housing, and a shielding being provided in an interior of the housing, which redirects the sub-flow in a direction oriented away from the optical access.

4. The particle sensor as recited in claim 3, wherein the shielding redirects the sub-flow from a direction oriented toward the optical access in a direction oriented away from the optical access.

5. The particle sensor as recited in claim 4, wherein the shielding redirects the sub-flow, from a direction oriented from the inlet opening toward the optical access in a direction oriented away from the optical access to the outlet opening.

6. The particle sensor as recited in claim 3, wherein the housing includes a housing body, in or at which the optical access is situated, and the housing further includes a protective tube module, which is fastened at the housing body or is integrated with the housing body, and includes at least one inlet opening, through which the sub-flow is removable from the flow of the measuring gas and introducible into an interior of the protective tube module, and includes at least one outlet opening, through which the sub-flow exits the protective tube module, and a shielding is provided in the interior of the protective tube module, which redirects the sub-flow in a direction oriented away from the optical access.

7. The particle sensor as recited in claim 6, wherein the protective tube module includes a first protective tube, which includes the at least one inlet opening through which the sub-flow is removable from the flow of the measuring gas and introducible into the interior of the protective tube module, and the protective tube module includes a second protective tube which is situated in the first protective tube in such a way that an annular space is formed between the first protective tube and the second protective tube, and the second protective tube includes at least one overflow opening through which the sub-flow flows from the annular space into a gas space situated in an interior of the second protective tube, and the outlet opening is formed at the first protective tube or at the second protective tube, and a device is provided which is configured to redirect the sub-flow as the sub-flow flows through or after it flows through the overflow opening in a direction oriented away from the optical access to the outlet opening.

8. The particle sensor as recited in claim 7, wherein the device configured to redirect the sub-flow as the sub-flow flows through or after it flows through the overflow opening in a direction oriented away from the optical access to the outlet opening, is at least one swirl flap formed at the overflow opening of the second protective tube, which points in a direction oriented away from the optical access to the outlet opening or is a third protective tube which is situated in the second protective tube and tapers in a conical or step-like manner in the direction pointing from the optical access to the outlet opening at a level of the overflow opening or is a recess formed in an end face of the housing body pointing away from the optical access which is situated opposite the overflow opening of the second protective tube.

9. The particle sensor as recited in claim 8, wherein the recess is a groove.

10. The particle sensor as recited in claim 7, wherein the device configured to redirect the sub-flow as the sub-flow flows through or after it flows through the overflow opening in a direction oriented away from the optical access to the outlet opening, completely or partially hinders a visibility of the optical access as viewed from the inlet opening and/or from the overflow opening.

11. The particle sensor as recited in claim 7, wherein the at least one overflow opening of the second protective tube includes multiple overflow openings, all of which are situated at the same level in the direction pointing from the optical access to the outlet opening.

12. The particle sensor as recited in claim 7, wherein the at least one overflow opening of the second protective tube includes 4 to 12 overflow openings, all of which are situated at the same level in the direction pointing from the optical access to the outlet opening.

13. The particle sensor as recited in claim 6, wherein the outlet opening is formed at an end face of the protective tube module pointing away from the housing body, and the inlet opening is situated, as viewed from the optical access, in front of the outlet opening in the direction pointing from the optical access to the outlet opening.

14. The particle sensor as recited in claim 13, wherein the at least one overflow opening of the second protective tube includes multiple overflow openings, all of which are situated at the same level in the direction pointing from the optical access to the outlet opening, and wherein the inlet openings are all situated, as viewed from the optical access, behind the overflow opening in the direction pointing from the optical access to the outlet opening.

15. The particle sensor as recited in claim 3, wherein the at least one inlet opening includes multiple inlet openings, all of which are situated at the same level in a direction pointing from the optical access to the outlet opening.

16. The particle sensor as recited in claim 15, wherein the at least one inlet opening includes 6 to 12 inlet openings, all of which are situated at the same level in a direction pointing from the optical access to the outlet opening.

17. The particle sensor as recited in claim 1, wherein the laser focus is situated outside the fluidically shielded area.

18. The particle sensor as recited in claim 1, wherein the device configured to generate laser light is a laser and/or the device configured to supply laser light is an optical fiber and/or the device configured to focus is the optical access configured as a lens, and/or the device configured to detect thermal radiation is a photodetector and/or the device configured to transfer thermal radiation is an optical fiber and/or the optical access is a window or an optical fiber.

\* \* \* \* \*